(12) United States Patent
Tarao et al.

(10) Patent No.: US 10,702,747 B2
(45) Date of Patent: Jul. 7, 2020

(54) GOLF BALL

(71) Applicant: Sumitomo Rubber Industries, Ltd., Kobe-shi, Hyogo (JP)

(72) Inventors: Toshiyuki Tarao, Kobe (JP); Mami Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/653,382

(22) Filed: Oct. 15, 2019

(65) Prior Publication Data

US 2020/0114215 A1  Apr. 16, 2020

(30) Foreign Application Priority Data

Oct. 16, 2018  (JP) .................. 2018-195346

(51) Int. Cl.
*A63B 37/06* (2006.01)
*A63B 37/00* (2006.01)
*C08L 33/10* (2006.01)
*C08L 29/04* (2006.01)

(52) U.S. Cl.
CPC ........ *A63B 37/0031* (2013.01); *A63B 37/008* (2013.01); *A63B 37/0075* (2013.01); *A63B 37/0083* (2013.01); *C08L 29/04* (2013.01); *C08L 33/10* (2013.01)

(58) Field of Classification Search
CPC ................................. A63B 37/0023
USPC ....................................... 473/378
See application file for complete search history.

(56) References Cited

U.S. PATENT DOCUMENTS

| | | | |
|---|---|---|---|
| 10,376,745 B2 * | 8/2019 | Tanaka | A63B 37/0024 |
| 2003/0224873 A1 | 12/2003 | Ichikawa et al. | |
| 2005/0020783 A1 | 1/2005 | Takesue et al. | |
| 2011/0098131 A1 | 4/2011 | Kasashima et al. | |
| 2018/0178080 A1 | 6/2018 | Tanaka et al. | |
| 2018/0178081 A1 | 6/2018 | Tanaka et al. | |

FOREIGN PATENT DOCUMENTS

| | | | |
|---|---|---|---|
| JP | 6-319832 A | 11/1994 | |
| JP | 10-314341 A | 12/1998 | |
| JP | 11-104274 A | 4/1999 | |
| JP | 2003-339911 A | 12/2003 | |
| JP | 2005-13487 A | 1/2005 | |
| JP | 2011-92708 A | 5/2011 | |
| JP | 2018-102692 A | 7/2018 | |
| JP | 2018-102694 A | 7/2018 | |

* cited by examiner

*Primary Examiner* — Raeann Gorden
(74) *Attorney, Agent, or Firm* — Birch, Stewart, Kolasch & Birch, LLP

(57) ABSTRACT

A golf ball strikes a good balance between the durability and the shot feeling, and includes a spherical core and at least one cover disposed outside the spherical core. At least one layer of the cover contains (A) a base resin and (B) a resin fine particle, (A) the base resin contains an ionomer resin, and (B) the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group.

19 Claims, 2 Drawing Sheets

GOLF BALL

FIELD OF THE INVENTION

The present invention relates to a golf ball comprising a spherical core and a cover.

DESCRIPTION OF THE RELATED ART

Properties of a golf ball such as resilience, durability and shot feeling are controlled, for example, by appropriately select a cover material.

For example, JP H10-314341 A discloses a golf ball cover material mainly containing a rubber modified thermoplastic resin composition obtained by blending a functional rubber-like copolymer in a base resin composed of an ionomer resin, a non-ionomer thermoplastic elastomer or a mixture thereof.

JP 2003-339911 A discloses a golf ball comprising a core and a plurality of covers covering the core, wherein at least one layer of the covers is formed from a material mainly containing an ionomer resin in which a compound having a molecular weight of twenty thousand or less and having two or more reactive functional groups is kneaded.

JP 2005-13487 A discloses a golf ball comprising a core and one or more cover covering the core, wherein at least one layer constituting the cover is formed from a material mainly containing a mixture including (A) an ionomer resin composition, (B) a thermoplastic elastomer which is any one among a thermoplastic polyester elastomer, a thermoplastic block copolymer and a thermoplastic polyurethane, and (C) a thermoplastic block copolymer having a functional group reactive with an ionomer resin at a terminal, in a ratio of (A)/[(B)+(C)]=50/50 to 98/2 (mass ratio) and (B)/(C)=9/1 to 1/1 (mass ratio).

As an invention aiming to strike a good balance between the durability and the flight performance of a golf ball, JP 2011-92708 A discloses a golf ball comprising a core, at least one intermediate layer and a cover, wherein the intermediate layer is mainly formed from a highly neutralized ionomer resin composition obtained by adding a basic inorganic metal compound or the like in an ordinary ionomer resin and hence having increased neutralization degree, and the cover is mainly formed from a mixture including an ionomer resin and a particulate inorganic filler.

JP H11-104274 A discloses a golf ball cover composition composed of 50 to 90 parts by weight of an ionomer resin, 10 to 50 parts by weight of a diene rubber, and 0.1 to 5 parts by weight of a non-polluting antioxidant, wherein the diene rubber is dispersed in the ionomer resin, and the dispersed diene rubber has a particle size of 5 μm or less.

JP H06-319832 A discloses a golf ball cover material composition obtained by adding a core-shell polymer (B) consisting of a core (a) of a rubber-like polymer and a shell (b) of a glass-like polymer, in an ionic ethylene copolymer (A) having an ethylene-unsaturated carboxylic acid copolymer as a base resin.

JP 2018-102692 A discloses a golf ball comprising a spherical core and at least one cover disposed outside the spherical core, wherein at least one layer of the cover contains (A) a base resin and (B) a polyrotaxane, wherein (A) the base resin contains (a-1) an ionomer resin and has a material hardness of 59 or more in Shore D hardness, and (B) the polyrotaxane has a cyclodextrin, a linear molecule piercing through the cyclic structure of the cyclodextrin, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group.

JP 2018-102694 A discloses a golf ball comprising a spherical core and at least one cover disposed outside the spherical core, wherein at least one layer of the cover contains (A) a base resin and (B) a polyrotaxane, wherein (A) the base resin contains (a-1) an ionomer resin and has a material hardness of 58 or less in Shore D hardness, and (B) the polyrotaxane has a cyclodextrin, a linear molecule piercing through the cyclic structure of the cyclodextrin, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group.

SUMMARY OF THE INVENTION

These prior arts fail to strike a sufficient balance between the durability and the shot feeling. An object of the present invention is to provide a golf ball having excellent durability and shot feeling.

The present invention which has solved the above problems provides a golf ball comprising a spherical core and at least one cover disposed outside the spherical core, wherein at least one layer of the cover contains (A) a base resin and (B) resin fine particles, (A) the base resin contains an ionomer resin, and (B) the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group.

According to the present invention, (B) the resin fine particles containing the polyrotaxane component exist in a state of being dispersed in (A) the base resin component constituting the cover. Thus, it is considered that the durability of the cover is improved due to the reinforcement effect of (B) the resin fine particles, without lowering the shot feeling of the cover.

According to the present invention, a golf ball having excellent durability and shot feeling is obtained.

DESCRIPTION OF THE PREFERRED EMBODIMENT

Figure 1:
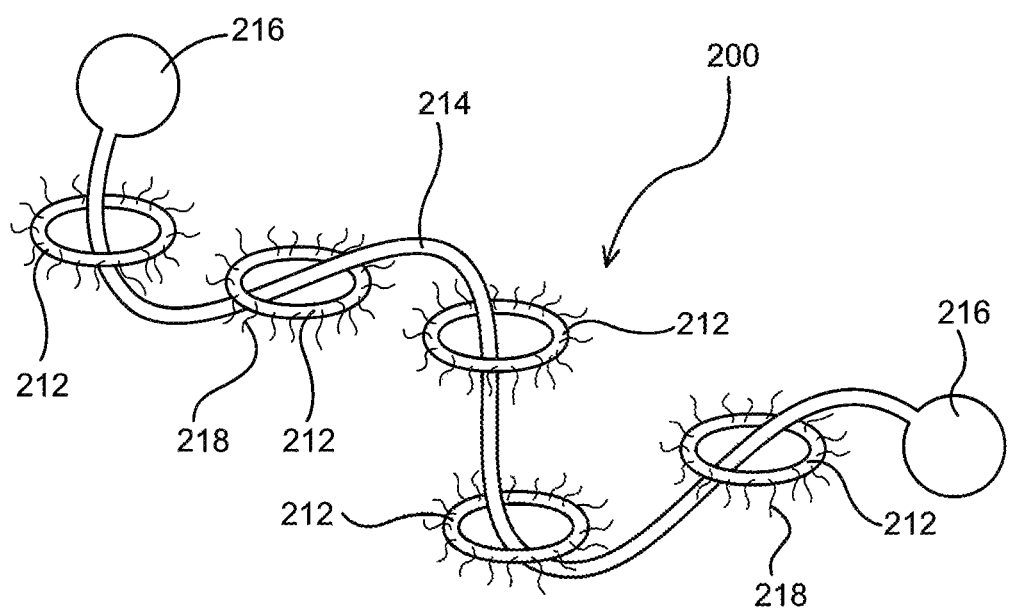
FIG. 1 is an illustrative figure showing a molecular structure of one example of a polyrotaxane used in the present invention.

The present invention provides a golf ball comprising a spherical core and at least one cover disposed outside the spherical core, wherein at least one layer of the cover contains (A) a base resin and (B) resin fine particles, (A) the base resin contains an ionomer resin, and (B) the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—C$_3$H$_6$—O— group. First, (A) the base resin used in the present invention will be explained.

[(A) Base Resin]

(A) The base resin contains (a-1) the ionomer resin as an essential component. Examples of (a-1) the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

It is noted that, in the present invention, "an ionomer resin consisting of a metal ion-neutralized product of a binary copolymer composed of an olefin and an α,β-unsaturated carboxylic acid having 3 to 8 carbon atoms" is sometimes simply referred to as "a binary ionomer resin", and "an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "a ternary ionomer resin".

The olefin is preferably an olefin having 2 to 8 carbon atoms. Examples of the olefin include ethylene, propylene, butene, pentene, hexene, heptene and octene, and ethylene is particularly preferable. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferable. In addition, as the α,β-unsaturated carboxylic acid ester, methyl ester, ethyl ester, propyl ester, n-butyl ester, isobutyl ester or the like of acrylic acid, methacrylic acid, fumaric acid, maleic acid or the like can be used, and acrylic acid ester or methacrylic acid ester is particularly preferable.

As the binary ionomer resin, a metal ion-neutralized product of an ethylene-(meth)acrylic acid binary copolymer is preferable. As the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary ionomer resin is preferably 5 mass % or more, more preferably 10 mass % or more, even more preferably 16 mass % or more, and most preferably 17 mass % or more, and is preferably 30 mass % or less, more preferably 25 mass % or less. If the amount of the α,β-unsaturated carboxylic acid component having 3 to 8 carbon atoms is 5 mass % or more, the obtained constituent member can be easily adjusted to a desired hardness. In addition, if the amount of the α,β-unsaturated carboxylic acid component having 3 to 8 carbon atoms is 30 mass % or less, the obtained constituent member is not excessively hard and hence has better durability and shot feeling.

The neutralization degree of the carboxyl groups of the binary ionomer resin is preferably 15 mole % or more, more preferably 20 mole % or more, and is preferably 90 mole % or less, more preferably 85 mole % or less. If the neutralization degree is 15 mole % or more, the obtained golf ball has better resilience and durability. On the other hand, if the neutralization degree is 90 mole % or less, the cover material has better fluidity (better moldability). It is noted that the neutralization degree of the carboxyl groups of the binary ionomer resin can be calculated by the following expression.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of the binary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium. As the binary ionomer resin, a mixture of a sodium-neutralized binary ionomer resin and a zinc-neutralized binary ionomer resin is preferably used. If this mixture is used, the resilience and the durability are further enhanced.

Specific examples of the binary ionomer resin in terms of trade names include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn), Himilan AM7337 (Na)" available from Mitsui-Du Pont Polychemicals Co., Ltd.

Specific examples of the binary ionomer resin in terms of trade names further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E.I. du Pont de Nemours and Company.

Examples of the ionomer resin available from ExxonMobil Chemical Corporation include "Iotek (registered trademark) (e.g. Iotek 8000 (Na), Iotek 8030 (Na), Iotek 7010 (Zn), Iotek 7030 (Zn))".

The above listed binary ionomer resins may be used solely or as a mixture of two or more of them. Na, Zn, Li, Mg and the like described in the parentheses after the trade names indicate metal types of neutralizing metal ions of the ionomer resins.

The bending stiffness of the binary ionomer resin is preferably 140 MPa or more, more preferably 150 MPa or more, and even more preferably 160 MPa or more, and is preferably 550 MPa or less, more preferably 500 MPa or less, and even more preferably 450 MPa or less. If the bending stiffness falls within the above range, the flight performance is excellent since the spin rate on driver shots is optimized, and the durability is also better.

The melt flow rate (190° C., 2.16 kgf) of the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the melt flow rate (190° C., 2.16 kgf) of the binary ionomer resin is 0.1 g/10 min or more, the cover material has better fluidity, and for example, a thin cover can be obtained. In addition, if the melt flow rate (190° C., 2.16 kgf) of the binary ionomer resin is 30 g/10 min or less, the obtained golf ball has better durability.

The amount of the α,β-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 90 mole % or less, more preferably 85 mole % or less. If the neutralization degree is 20 mole % or more, the obtained golf ball has better resilience and durability, and if the neutralization degree is 90 mole % or less, the cover material has better fluidity (better moldability). It is noted that the neutralization degree of the carboxyl groups of the ionomer resin can be calculated by the following expression.

Neutralization degree of ionomer resin (mole %)=100×(mole number of neutralized carboxyl groups in ionomer resin/mole number of all carboxyl groups in ionomer resin)

Examples of the metal ion for neutralizing at least a part of carboxyl groups of the ternary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium.

Specific examples of the ternary ionomer resin in terms of trade names include "Himilan (registered trademark) (e.g. Himilan AM7327 (Zn), Himilan 1855 (Zn), Himilan 1856 (Na), Himilan AM7331 (Na))" available from Mitsui-Du Pont Polychemicals Co., Ltd. Further, examples of the ternary ionomer resin available from E.I. du Pont de Nemours and Company include "Surlyn 6320 (Mg), Surlyn 8120 (Na), Surlyn 8320 (Na), Surlyn 9320 (Zn), Surlyn 9320W (Zn), etc.)". In addition, Examples of the ternary ionomer resin available from ExxonMobil Chemical Corporation include "Iotek 7510 (Zn), Iotek 7520 (Zn), etc.)". It is noted that Na, Zn, Mg and the like described in the parentheses after the trade names indicate types of neutralizing metal ions. The ternary ionomer resin may be used solely, or two or more of them may be used in combination.

The bending stiffness of the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the bending stiffness falls within the above range, the flight performance is excellent since the spin rate on driver shots is optimized, and the durability is also better.

The melt flow rate (190° C., 2.16 kgf) of the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the melt flow rate (190° C., 2.16 kgf) of the ternary ionomer resin is 0.1 g/10 min or more, the cover material has better fluidity, and a thin constituent member can be formed. In addition, if the melt flow rate (190° C., 2.16 kgf) of the ternary ionomer resin is 20 g/10 min or less, the obtained golf ball has better durability.

The amount of (a-1) the ionomer resin in (A) the resin component is preferably 50 mass % or more, more preferably 60 mass % or more, and even more preferably 70 mass % or more. If the amount of (a-1) the ionomer resin is 50 mass % or more, lowering in the resilience of the golf ball can be suppressed. The upper limit of the amount is preferably but not limited to 100 mass %.

The material hardness of (a-1) the ionomer resin used in the present invention is preferably 40 or more, more preferably 42 or more, and even more preferably 45 or more, and is preferably 75 or less, more preferably 70 or less, and even more preferably 65 or less in Shore D hardness. If the material hardness is 40 or more in Shore D hardness, the obtained golf ball has further enhanced resilience. In addition, if the material hardness is 75 or less in Shore D hardness, lowering in the durability due to the repeated hitting can be further suppressed.

(a-1) The ionomer resin used in the present invention may also be prepared by neutralizing a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester with a metal compound when molding the cover.

The olefin is preferably an olefin having 2 to 8 carbon atoms. Examples of the olefin include ethylene, propylene, butene, pentene, hexene, heptene and octene, and ethylene is particularly preferable. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferable. In addition, as the α,β-unsaturated carboxylic acid ester, methyl ester, ethyl ester, propyl ester, n-butyl ester, isobutyl ester or the like of acrylic acid, methacrylic acid, fumaric acid, maleic acid or the like can be used, and acrylic acid ester or methacrylic acid ester is particularly preferable.

Specific examples of the binary copolymer in terms of trade names include an ethylene-methacrylic acid copolymer in a trade name of "NUCREL (registered trademark) (e.g. "NUCREL N1050H", "NUCREL N2050H", "NUCREL N1110H", "NUCREL NO200H")" available from Mitsui-Du Pont Polychemicals Co., Ltd.; and an ethylene-acrylic acid copolymer in a trade name of "PRIMACOR (registered trademark) 59801" available from Dow Chemical Corporation.

Specific examples of the ternary copolymer in terms of trade names include trade name "NUCREL (registered trademark) (e.g. "NUCREL AN4318" "NUCREL AN4319")" available from Mitsui-Du Pont Polychemicals Co., Ltd.; trade name "NUCREL (registered trademark) (e.g. "NUCREL AE")" available from E.I. du Pont de Nemours and Company; and trade name "PRIMACOR (registered trademark) (e.g. "PRIMACOR AT310", "PRIMACOR AT320")" available from Dow Chemical Corporation. The binary copolymer or ternary copolymer may be used solely, or two or more of them may be used in combination.

Examples of the metal compound for neutralizing the carboxyl group of the binary copolymer and/or the ternary copolymer include a metal hydroxide such as magnesium hydroxide, zinc hydroxide, calcium hydroxide, sodium hydroxide, lithium hydroxide, potassium hydroxide and copper hydroxide; a metal oxide such as magnesium oxide, calcium oxide, zinc oxide and copper oxide; and a metal carbonate such as magnesium carbonate, zinc carbonate, calcium carbonate, sodium carbonate, lithium carbonate and potassium carbonate.

(A) The base resin may further contain a resin component (hereinafter sometimes referred to as "(a-2) the non-ionomer resin") other than the ionomer resin. Examples of (a-2) the non-ionomer resin include a thermoplastic resin such as a polyamide and a polyolefin; a thermoplastic elastomer such as a styrene elastomer, a polyolefin elastomer, a polyamide elastomer and a polyester elastomer; a binary copolymer composed of an olefin and an α,β-unsaturated carboxylic acid having 3 to 8 carbon atoms such as an ethylene-(meth)acrylic acid copolymer; and a ternary copolymer composed of an olefin, an α,β-unsaturated carboxylic acid having 3 to 8 carbon atoms and an α,β-unsaturated carboxylic acid ester such as an ethylene-(meth)acrylic acid-(meth)acrylic acid ester copolymer. (a-2) The non-ionomer resin may be used solely, or two or more of them may be used in combination. In addition, (A) the base resin may consist of (a-1) the ionomer resin.

As (a-2) the non-ionomer resin, at least one member selected from the group consisting of the polyamide, the styrene elastomer, the polyolefin elastomer, the polyamide elastomer, the polyester elastomer, the binary copolymer composed of an olefin and an α,β-unsaturated carboxylic acid having 3 to 8 carbon atoms, and the ternary copolymer composed of an olefin, an α,β-unsaturated carboxylic acid having 3 to 8 carbon atoms and an α,β-unsaturated carboxylic acid ester, is preferable.

The polyamide is not particularly limited as long as it is a thermoplastic resin having a plurality of amide bonds (—NH—CO—) in the main chain of the molecule, and examples thereof include a product having amide bonds formed in the molecule through ring-opening polymerization of a lactam, or a reaction between a diamine component and a dicarboxylic acid component.

Examples of the polyamide include an aliphatic polyamide such as polyamide 6, polyamide 11, polyamide 12, polyamide 66, polyamide 610, polyamide 6T, polyamide 6I, polyamide 9T, polyamide M5T and polyamide 612; an aromatic polyamide such as poly-p-phenylene terephthalamide and poly-m-phenylene isophthalamide. These polyamides may be used solely, or two or more of them may be used in combination. Among them, the aliphatic polyamide such as polyamide 6, polyamide 66, polyamide 11 and polyamide 12 is preferable.

Specific examples of the polyamide in terms of trade names include "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, Rilsan BMN P40 D)" available from Arkema K.K.

The polyolefin is not particularly limited as long as it is synthesized by using one or more olefins as a monomer. The olefin is preferably an olefin having 2 to 8 carbon atoms. Examples of the olefin include ethylene, propylene, butene, pentene, hexene, heptene and octene. As the polyolefin, polyethylene and polypropylene are preferable, polyethylene is more preferable.

As the styrene elastomer, a thermoplastic elastomer containing a styrene block is suitably used. The styrene block-containing thermoplastic elastomer has a polystyrene block which is a hard segment, and a soft segment. Typical soft segment is a diene block. Examples of the constituent component of the diene block include butadiene, isoprene, 1,3-pentadiene and 2,3-dimethyl-1,3-butadiene. Butadiene and isoprene are preferable. Two or more of the constituent components may be used in combination.

Examples of the thermoplastic elastomer containing the styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS, and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the thermoplastic elastomer containing the styrene block is preferably 10 mass % or more, more preferably 12 mass % or more, and particularly preferably 15 mass % or more. From the viewpoint of the shot feeling of the obtained golf ball, the amount is preferably 50 mass % or less, more preferably 47 mass % or less, and particularly preferably 45 mass % or less.

Examples of the thermoplastic elastomer containing the styrene block include an alloy of one member or at least two members selected from the group consisting of SBS, SIS, SIBS, SEBS, SEPS, SEEPS and hydrogenated products thereof with a polyolefin. It is estimated that the olefin component in the alloy contributes to the improvement in compatibility with the ionomer resin. If the alloy is used, the resilience performance of the golf ball is enhanced. An olefin having 2 to 10 carbon atoms is preferably used. Suitable examples of the olefin include ethylene, propylene, butene and pentene. Ethylene and propylene are particularly preferable.

Specific examples of the alloy include "TEFABLOC (registered trademark) T32210", "TEFABLOC T3339C", "TEFABLOC SJ4400N", "TEFABLOC SJ5400N", "TEFABLOC SJ6400N", "TEFABLOC SJ7400N", "TEFABLOC SJ8400N", "TEFABLOC SJ9400N" and "TEFABLOC SR04" available from Mitsubishi Chemical Corporation. Other specific examples of the thermoplastic elastomer containing the styrene block include "Epofriend A1010" available from Daicel Chemical Industry Co., Ltd., and "SEPTON HG-252" available from Kuraray Co., Ltd.

The polyolefin elastomer preferably includes ethylene as a constituent component. Examples of the thermoplastic polyolefin elastomer containing a functional group include an ethylene-glycidyl (meth)acrylate copolymer, an ethylene-(meth)acrylic acid ester-glycidyl (meth)acrylate copolymer, and an ethylene-glycidyl (meth)acrylate-vinyl acetate copolymer.

The polyamide elastomer has a hard segment portion composed of a polyamide component, and a soft segment portion. Examples of the soft segment portion of the polyamide elastomer include a polyether ester component and a polyether component. Examples of the polyamide elastomer include a polyether ester amide obtained by a reaction between a polyamide component (hard segment component) and a polyether ester component (soft segment component) which is formed from a polyoxyalkylene glycol and a dicarboxylic acid; and a polyether amide obtained by a reaction between a polyamide component (hard segment component) and a polyether component (soft segment component) which is formed from a dicarboxylic acid or diamine and a compound obtained by aminating or carboxylating both terminals of a polyoxyalkylene glycol.

Examples of the polyamide elastomer include "PEBAX 2533", "PEBAX 3533", "PEBAX 4033" and "PEBAX 5533" available from Arkema K.K.

Examples of the polyester elastomer include a block copolymer having a hard segment composed of a polyester component, and a soft segment. Examples of the polyester component constituting the hard segment include an aromatic polyester. Examples of the soft segment component include an aliphatic polyether and an aliphatic polyester.

Specific examples of the polyester elastomer include "Hytrel 3548" and "Hytrel 4047" available from Du Pont-Toray Co., Ltd., and "Primalloy A1606", "Primalloy B1600" and "Primalloy B1700" available from Mitsubishi Chemical Corporation.

Specific examples of the ethylene-(meth)acrylic acid copolymer include an ethylene-methacrylic acid copolymer in a trade name of "NUCREL (registered trademark) (e.g. "NUCREL N1050H", "NUCREL N2050H", "NUCREL N1110H", "NUCREL NO200H")" available from Mitsui- Du Pont Polychemicals Co., Ltd.; and an ethylene-acrylic acid copolymer in a trade name of "PRIMACOR (registered trademark) 59801" available from Dow Chemical Corporation.

Specific examples of the ethylene-(meth)acrylic acid-(meth)acrylic acid ester copolymer include trade name "NUCREL (registered trademark) (e.g. "NUCREL AN4318" "NUCREL AN4319")" available from Mitsui-Du Pont Polychemicals Co., Ltd.; trade name "NUCREL (registered trademark) (e.g. "NUCREL AE")" available from E.I. du Pont de Nemours and Company; and trade name "PRIMACOR (registered trademark) (e.g. "PRIMACOR AT310", "PRIMACOR AT320")" available from Dow Chemical Corporation.

In the case that (A) the base resin contains (a-2) the non-ionomer resin, the amount of (a-2) the non-ionomer resin in (A) the base resin is preferably 1 mass % or more, more preferably 3 mass % or more, and even more preferably 5 mass % or more, and is preferably 50 mass % or less, more preferably 40 mass % or less, and even more preferably 30 mass % or less. If the amount of (a-2) the non-ionomer resin is 1 mass % or more, the obtained golf ball has better shot feeling, and if the amount of (a-2) the non-ionomer resin is 50 mass % or less, lowering in the durability of the golf ball can be suppressed.

In the case that (A) the base resin contains (a-2) the non-ionomer resin, the mass ratio ((a-2)/(a-1)) of the amount of (a-2) the non-ionomer resin to the amount of (a-1) the ionomer resin in (A) the base resin is preferably 1/99 or more, more preferably 3/97 or more, and even more preferably 5/95 or more, and is preferably 50/50 or less, more preferably 40/60 or less, and even more preferably 30/70 or less.

The material hardness of (A) the base resin used in the present invention is preferably 30 or more, more preferably 35 or more, and even more preferably 40 or more, and is preferably 80 or less, more preferably 75 or less, and even more preferably 70 or less in Shore D hardness. If the material hardness of (A) the base resin is 30 or more in Shore D hardness, the obtained golf ball has further enhanced resilience. In addition, the material hardness of (A) the base resin is 80 or less in Shore D hardness, lowering in the durability due to repeated hitting can be further suppressed. The material hardness of the base resin is a slab hardness of the base resin which is molded into a sheet shape.

Next, (B) the resin fine particles containing a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group (hereinafter sometimes simply referred to as "(B) the polyrotaxane fine particle") used in the present invention, will be explained.

(B) The polyrotaxane fine particles contain a polyrotaxane component. The polyrotaxane component has a cyclodextrin, a linear molecule penetrating the cyclic structure of the cyclodextrin in a skewering manner, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is preferably a linear molecule piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily penetrate the cyclic structure of the cyclodextrin in a skewering manner.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule easily reacts with the blocking group. Examples of the functional group include a hydroxyl group, carboxyl group, amino group, and thiol group.

The blocking group is not particularly limited, as long as it is located at both terminals of the linear molecule to prevent disassociation of the cyclodextrin from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins penetrated by the linear molecule preferably ranges from 0.06 to 0.61, more preferably ranges from 0.11 to 0.48, and even more preferably ranges from 0.24 to 0.41, if the maximum number thereof is deemed as 1. This is because if the number is less than 0.06, the pulley effect may not be exerted, and if the number exceeds 0.61, the cyclodextrins are very densely located, so that the movability of the cyclodextrin may decrease.

As the polyrotaxane, a polyrotaxane having at least a part of hydroxyl groups of the cyclodextrin being modified with a caprolactone chain, is preferred. Modifying with the caprolactone enhances the compatibility with the base resin component constituting the cover. In addition, modifying with the caprolactone enhances the flexibility of the polyrotaxane, and thus the spin performance on approach shots is enhanced.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—$C_3H_6$—O— group. "n" represents the degree of polymerization, and is preferably a natural number of 1 to 100, more preferably a natural number of 2 to 70, and even more preferably a natural number of 3 to 40. At another terminal of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more, and is preferably 100 mole % or less, more preferably 90 mole % or less, and even more preferably 80 mole % or less. If the ratio of the hydroxyl groups modified with the caprolactone chain falls within the above range, the flexibility of the polyrotaxane is greater, and thus the spin performance under a wet condition is further enhanced.

FIG. 1 is an illustrative figure showing a molecular structure of one example of a polyrotaxane used in the present invention. The polyrotaxane 200 has a cyclodextrin 212, a linear molecule 214 piercing through the cyclic structure of the cyclodextrin 212, and blocking groups 216 located at both terminals of the linear molecule 214 to prevent disassociation of the cyclic molecule, wherein a caprolactone chain 218 bonds to an exterior side of the cyclic structure of the cyclodextrin via a —O—$C_3H_6$—O— group (not shown).

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and particularly preferably 180 mg KOH/g or less. This is because if the hydroxyl value of the polyrotaxane falls within the above range, the reactivity with the polyisocyanate is enhanced. It is noted that the hydroxyl value can be measured according to JIS K 1557-1, for example, by an acetylation method.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. This is because if the weight average molecular weight is less than 30,000, the durability improvement effect is small, and if the weight average molecular weight is more than 3,000,000, the reactivity with the polyisocyanate is lowered. It is noted that the weight average molecular weight can be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

(B) The polyrotaxane fine particles are preferably crosslinked resin fine particles, and more preferably one obtained by curing the polyrotaxane component with a polyisocyanate component. This is because if the polyrotaxane component is cured with the polyisocyanate component, the fine particles having the crosslinked structure is easily obtained.

Examples of the polyisocyanate component constituting the crosslinked resin fine particles include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene diisocyanate (TMXDI), para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI), and derivatives of these polyisocyanates.

The median particle size (particle size at 50% in the volume accumulation distribution) of (B) the polyrotaxane fine particles used in the present invention is preferably 1 μm or more, more preferably 3 μm or more, and even more preferably 5 μm or more, and is preferably 50 μm or less, more preferably 45 μm or less, and even more preferably 40 μm or less. This is because if the median particle size of (B) the polyrotaxane fine particles falls within the above range, the dispersibility of (B) the polyrotaxane fine particles is better.

(B) The polyrotaxane fine particles are preferably spherical.

At least one layer of the cover of the golf ball according to the present invention is formed from a cover composition containing, as a resin component, (A) the base resin and (B) the polyrotaxane fine particles. The cover containing (A) the base resin and (B) the polyrotaxane fine particles contain (B) the polyrotaxane fine particles preferably in an amount of 1 part by mass or more, more preferably in an amount of 2 parts by mass or more, and even more preferably in an amount of 3 parts by mass or more, and preferably in an amount of 20 parts by mass or less, more preferably in an amount of 15 parts by mass or less, and even more preferably in an amount of 10 parts by mass or less, with respect to 100 parts by mass of (A) the base resin component. This is because if (B) the polyrotaxane fine particles are contained in an amount falling within the above range, the durability is enhanced.

In the case that the golf ball according to the present invention comprises a plurality of covers, at least one layer of the cover contains (A) the base resin and (B) the polyrotaxane fine particles, and the layer not containing (A) the base resin and (B) the polyrotaxane fine particles may contain other resin component. Examples of the other resin include a thermoplastic resin such as a polyurethane, an ionomer resin, a polyamide and a polyethylene; and a thermoplastic elastomer such as a styrene elastomer, a polyolefin elastomer, a polyurethane elastomer, a polyamide elastomer and a polyester elastomer.

Specific examples of the other resin in terms of trade names include an ionomer resin in a trade name of "Himilan (registered trademark)" available from Mitsui-Du Pont Polychemicals Co., Ltd.; a thermoplastic polyurethane elastomer in a trade name of "Elastollan (registered trademark)" available from BASF Japan Ltd.; a thermoplastic polyamide elastomer in a trade name of "Pebax (registered trademark)" available from Arkema K. K.; a thermoplastic polyester elastomer in a trade name of "Hytrel (registered trademark)" available from Du Pont-Toray Co., Ltd.; and a thermoplastic styrene elastomer in a trade name of "TEFABLOC (registered trademark)" or a thermoplastic polyester based elastomer in a trade name of "Primalloy" available from Mitsubishi Chemical Corporation.

The total amount of (A) the base resin and (B) the polyrotaxane fine particles with respect to all the resin components in the cover containing (A) the base resin and (B) the polyrotaxane fine particles is preferably 60 mass % or more, more preferably 70 mass % or more, and even more preferably 80 mass % or more. If the total amount is 60 mass % or more, the obtained golf ball has further enhanced resilience. The upper limit of the total amount is preferably, but is not limited to, 100 mass %.

The cover of the golf ball according to the present invention may further contain a pigment component such as a white pigment (e.g. titanium oxide), a blue pigment and a red pigment; a weight adjusting agent such as calcium carbonate and barium sulfate; a dispersant; an antioxidant; an ultraviolet absorber; a light stabilizer; a fluorescent material or fluorescent brightener; and the like, as long as they do not impair the performance of the cover.

In the present invention, the material hardness of the cover containing (A) the base resin and (B) the polyrotaxane fine particles is preferably 30 or more, more preferably 35 or more, and even more preferably 40 or more, and is preferably 80 or less, more preferably 75 or less, and even more preferably 70 or less in Shore D hardness. If the material hardness is 30 or more in Shore D hardness, the resilience is higher, and thus the flight distance on driver shots is increased. In addition, if the material hardness is 80 or less in Shore D hardness, the obtained golf ball has better shot feeling on driver shots. The material hardness of the cover containing (A) the base resin and (B) the polyrotaxane fine particles is a slab hardness of the cover composition containing (A) the base resin and (B) the polyrotaxane fine particles which is molded into a sheet shape.

The spherical core of the golf ball according to the present invention is preferably formed from a resin composition or a rubber composition, more preferably formed from a rubber composition. The spherical core can be formed, for example, by heat pressing a rubber composition (hereinafter sometimes simply referred to as "core rubber composition") containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its super resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 15 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. Examples of the organic sulfur compound include compounds of diphenyl disulfides (diphenyl disulfide, bis(pentabromophenyl) disulfide, etc.), thiophenols or thionaphthols (naphthalene thiols). The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. As the carboxylic acid, either an aliphatic carboxylic acid or an aromatic carboxylic acid (benzoic acid, etc.) can be used. The amount of the carboxylic acid and/or the salt thereof is preferably 1 part by mass or more and 40 parts by mass or less with respect to 100 parts by mass of the base rubber.

The core rubber composition may further appropriately contain a weight adjusting agent such as zinc oxide and barium sulfate, an antioxidant, a coloring powder, and the like, in addition to the base rubber, the co-crosslinking agent, the crosslinking initiator and the organic sulfur compound.

[Construction of Golf Ball]

The construction of the golf ball according to the present invention is not particularly limited, as long as the golf ball comprises a spherical core and at least one cover covering the spherical core. Examples of the golf ball include a two-piece golf ball composed of a single layered spherical core and a single layered cover covering the spherical core wherein the single layered cover contains (A) the base resin and (B) the polyrotaxane fine particles; a three-piece golf ball composed of a single layered spherical core, an inner cover covering the spherical core, and an outer cover covering the inner cover wherein any one or both of the inner cover and the outer cover contain (A) the base resin and (B) the polyrotaxane fine particles; a multi-piece golf ball (four-piece golf ball, five-piece golf ball, etc.) composed of a single layered spherical core, two or more inner covers covering the spherical core, and an outermost cover covering the inner covers wherein at least one layer of the two or more inner covers contains (A) the base resin and (B) the polyrotaxane fine particles; and a multi-piece golf ball (four-piece golf ball, five-piece golf ball, etc.) composed of a single layered spherical core, two or more inner covers covering the spherical core, and an outermost cover covering the inner covers wherein the outermost cover contains (A) the base resin and (B) the polyrotaxane fine particles.

In an embodiment of the multi-piece golf ball (four-piece golf ball, five-piece golf ball, etc.) composed of a single layered spherical core, two or more inner covers covering the spherical core, and an outermost cover covering the inner covers wherein at least one layer of the two or more inner covers contains (A) the base resin and (B) the polyrotaxane fine particles, the outermost layer of the inner covers preferably contains (A) the base resin and (B) the polyrotaxane fine particles, and all the layers of the inner covers may contain (A) the base resin and (B) the polyrotaxane fine particles.

In an embodiment of the multi-piece golf ball (four-piece golf ball, five-piece golf ball, etc.) composed of a single layered spherical core, two or more inner covers covering the spherical core, and an outermost cover covering the inner covers wherein the outermost cover contains (A) the base resin and (B) the polyrotaxane fine particles, at least one layer of the two or more inner covers may contain (A) the base resin and (B) the polyrotaxane fine particles. In this case, the outermost layer of the inner covers preferably contains (A) the base resin and (B) the polyrotaxane fine particles, and all the layers of the inner covers may contain (A) the base resin and (B) the polyrotaxane fine particles.

The diameter of the spherical core of the golf ball according to the present invention is preferably 34.7 mm or more, more preferably 36.0 mm or more, and even more preferably 36.5 mm or more, and is preferably 41.7 mm or less, more preferably 41.0 mm or less, and even more preferably 40.0 mm or less. If the diameter of the spherical core is 34.7 mm or more, the cover is not excessively thick and thus the resilience is better. On the other hand, if the diameter of the spherical core is 41.7 mm or less, the cover is not excessively thin and thus the cover functions better.

When the spherical core has a diameter in a range of from 34.7 mm to 41.7 mm, the compression deformation amount of the spherical core (shrinking amount of the spherical core along the compression direction) when applying a load from 98 N as an initial load to 1275 N as a final load to the spherical core is preferably 2.0 mm or more, more preferably 2.1 mm or more, and even more preferably 2.2 mm or more, and is preferably 6.0 mm or less, more preferably 5.5 mm or less, and even more preferably 5.0 mm or less. If the compression deformation amount is 2.0 mm or more, the shot feeling is better, and if the compression deformation amount is 6.0 mm or less, the resilience is better.

The thickness of the cover of the golf ball according to the present invention is preferably 0.5 mm or more, more preferably 0.6 mm or more, and even more preferably 0.7 mm or more, and is preferably 4.0 mm or less, more preferably 3.0 mm or less, and even more preferably 2.0 mm or less. If the thickness of the cover falls within the above range, lowering in the durability and wear resistance of the cover can be further suppressed. In the case that the cover has a plurality of layers, it is preferred that the total thickness of the covers falls within the above range.

In the case that the golf ball according to the present invention has two or more inner covers and an outermost cover, the total thickness of the inner covers is preferably 0.5 mm or more, more preferably 0.6 mm or more, and even more preferably 0.7 mm or more, and is preferably 4.0 mm or less, more preferably 3.5 mm or less, and even more preferably 3.0 mm or less. In addition, the thickness of each layer of the inner covers is preferably 0.3 mm or more, more preferably 0.4 mm or more, and even more preferably 0.5 mm or more, and is preferably 2.0 mm or less, more preferably 1.8 mm or less, and even more preferably 1.6 mm or less.

The thickness of the outermost cover is preferably 4.0 mm or less, more preferably 3.0 mm or less, and even more preferably 2.0 mm or less, and is preferably 0.3 mm or more, more preferably 0.4 mm or more, and even more preferably 0.5 mm or more. If the thickness of the outermost cover falls within the above range, the obtained golf ball has better resilience and shot feeling.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball according to the present invention preferably has a diameter in a range of from 40 mm to 45 mm. In light of satisfying a regulation of US Golf Association (USGA), the diameter is particularly preferably 42.67 mm or more. In light of prevention of air resistance, the diameter is more preferably 44 mm or less, and even more preferably 42.80 mm or less. In addition, the golf ball preferably has a mass of 40 g or more and 50 g or less. In light of obtaining greater inertia, the mass is more preferably 44 g or more, and even more preferably 45.00 g or more. In light of satisfying a regulation of USGA, the mass is particularly preferably 45.93 g or less.

When the golf ball according to the present invention has a diameter in a range of from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes higher.

[Production Method of Golf Ball]

The spherical core of the golf ball according to the present invention can be molded, for example, by heat pressing the spherical core rubber composition. The molding conditions for heat pressing the core rubber composition may be appropriately determined depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

Examples of the method for molding the cover of the golf ball according to the present invention include a method of molding the cover composition into a hollow-shell, covering the core with a plurality of the hollow-shells and subjecting the core with a plurality of the hollow shells to the compression molding (preferably a method of molding the cover composition into a half hollow-shell, covering the core with two of the half hollow-shells, and subjecting the core with two of the half hollow-shells to the compression molding); and a method of injection molding the cover composition directly onto the spherical core. The cover of the golf ball according to the present invention is preferably formed by the injection molding method. This is because if the injection molding method is adopted, the cover is easily produced.

When molding the cover in the compression molding method, the molding of the half shell may be conducted by either a compression molding method or an injection molding method. The compression molding of the cover composition into the half shell can be carried out, for example, under a pressure of 1 MPa or more and 20 MPa or less at a molding temperature of −20° C. or more and 70° C. or less relative to the flow beginning temperature of the cover composition. By performing the molding under the above conditions, a half shell having a uniform thickness can be formed. Examples of the method for molding the cover using the half shells include a method of covering the spherical core with two of the half shells and then subjecting the core with two of the half shells to the compression molding. The compression molding of the half shells into the cover can be carried out, for example, under a pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the obtained cover composition extruded in a pellet form may be used for the injection molding, or the cover materials such as the base resin component and the pigment may be dry blended, followed by directly injection molding the blended material. It is preferable to use upper and lower molds having a hemispherical cavity and pimples for forming the cover, wherein a part of the pimples also serves as a retractable hold pin. When molding the cover by the injection molding, for example, the hold pin is protruded to hold the core, and the cover composition is charged and then cooled to obtain the cover, and the molding of the cover may be conducted as follows: the cover composition heated to 200° C. to 250° C. is charged for 0.5 to 5 seconds into a mold held under a pressure of 9 MPa to 15 MPa, and after cooling for 10 to 60 seconds, the mold is opened.

In case of using an injection molding machine having an extruder and molds to mold the cover, the temperature at the cylinder (barrel) portion of the extruder (the setting temperature of the extruder) is preferably 200° C. or more, more preferably 210° C. or more, and is preferably 270° C. or less, more preferably 260° C. or less. If the temperature at the cylinder (barrel) portion falls within the above range, the fluidity of the cover composition can be maintained.

The golf ball having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

Figure 2:
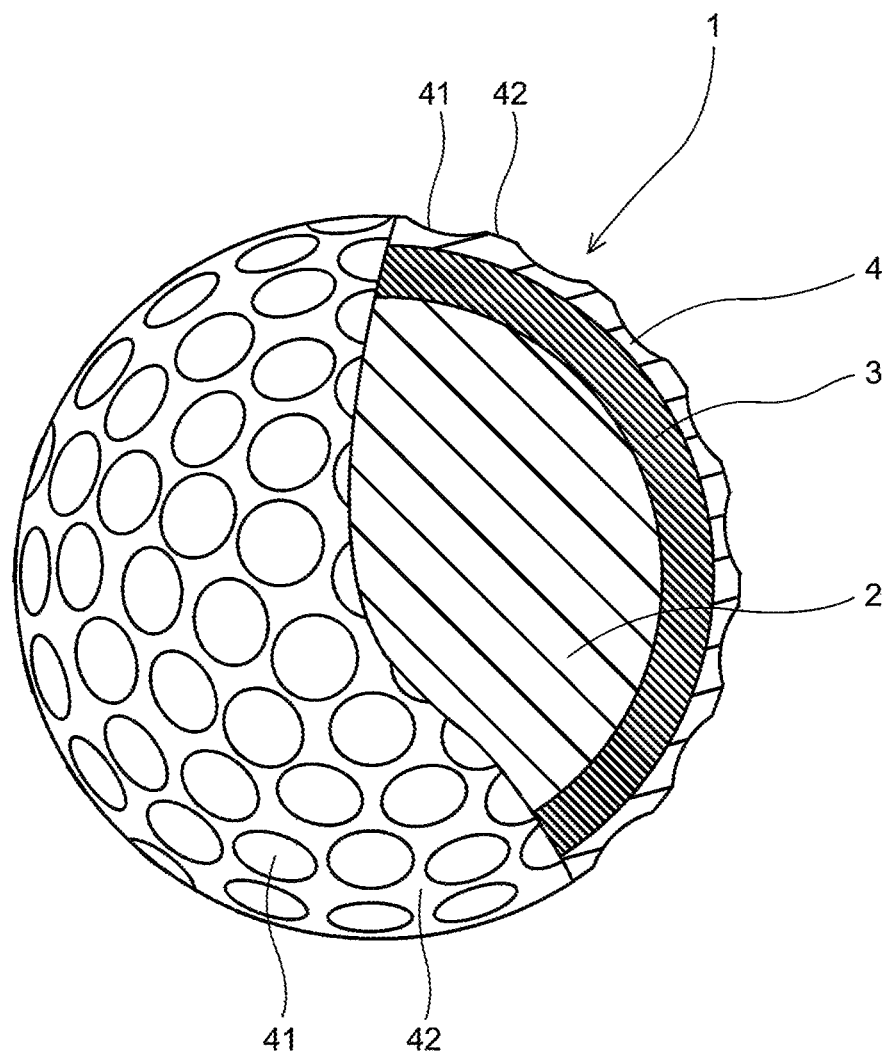
FIG. 2 is a partially cutaway cross-sectional view of a golf ball according to one embodiment of the present invention.

FIG. 2 is a partially cutaway cross-sectional view of a golf ball 1 according to one embodiment of the present invention. The golf ball 1 comprises a spherical core 2, an inner cover 3 disposed outside the spherical core 2, and an outer cover 4 disposed outside the inner cover 3. A plurality of dimples 41 are formed on the surface of the outer cover 4. Other portion than the dimples 41 on the surface of the outer cover 4 is a land 42. In a preferable embodiment of the present invention, one of or both of the outer cover 4 and the inner cover 3 contain (A) the base resin and (B) the polyrotaxane fine particles.

Examples

Next, the present invention will be described in detail by way of examples. However, the present invention is not limited to the examples described below. Various changes and modifications without departing from the spirit of the present invention are included in the scope of the present invention.

[Evaluation Methods]
(1) Compression Deformation Amount (Mm)

A compression deformation amount of the core (a shrinking amount of the core along the compression direction), when applying a load from an initial load of 98 N to a final load of 1275 N to the core, was measured.

(2) Material Hardness (Shore D Hardness)

Sheets with a thickness of about 2 mm were produced by injection molding (cylinder temperature: 230° C.) the base resin or cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D". When measuring the material hardness of the cover composition, a composition obtained by adding predetermined materials ((B) the polyrotaxane fine particles, titanium dioxide, etc.) in (A) the base resin was used for the measurement.

(3) Durability

A test of using an air gun to allow each golf ball to collide 100 times at a speed of 45 m/sec with a metal plate, was conducted. The test was conducted using twelve samples for each golf ball, and the durability of each golf ball was evaluated according to the following standard. The case where no golf ball of twelve golf balls was damaged was as evaluated as "G (good)", the case where one to three of twelve golf balls were damaged was evaluated as "F (Fair), and the case where four or more of twelve golf balls were damaged was evaluated as "P (Poor)".

(4) Shot Feeling

An actual hitting test was carried out by ten amateur golfers (high skilled persons) using a driver. In accordance with the following grading standard, the feeling of each golfer at hitting the golf ball was evaluated. The shot feeling most evaluated by the ten golfers was adopted as the shot feeling of that golf ball.

Grading Standard

G (good): The impact is right and the feeling is good.
F (fair): Ordinary
P (poor): The impact is heavy and the feeling is poor.

[Production of Golf Ball]
(1) Production of Spherical Core

According to the formulations shown in Table 1, the rubber compositions were kneaded, and heat pressed in upper and lower molds, each having a hemispherical cavity, to obtain spherical cores. It is noted that barium sulfate was appropriately added such that the obtained golf balls had a mass of 45.6 g.

TABLE 1

| Rubber composition No. | | A | B | C |
|---|---|---|---|---|
| Formulation (parts by mass) | Polybutadiene rubber | 100 | 100 | 100 |
| | Zinc acrylate | 26 | 24 | 32 |
| | Zinc oxide | 5 | 5 | 10 |
| | Barium sulfate | Appropriate amount* | Appropriate amount* | Appropriate amount* |
| | Dicumyl peroxide | 0.7 | 1.5 | 0.8 |
| | Diphenyl disulfide | 0.5 | 0.5 | 0.5 |
| | PBDS | — | — | 0.3 |
| | 2-Naphthalene thiol | — | — | 0.1 |
| | Benzoic acid | — | — | 2 |
| Molding condition | Molding temperature (° C.) | 170 | 170 | 150 |
| | Molding time (min) | 15 | 20 | 20 |
| Core diameter (mm) | | 38.2 | 39.1 | 39.7 |
| Compression deformation amount (mm) | | 4.4 | 4.1 | 3.2 |

*The amount was adjusted such that the golf ball had a mass of 45.6 g.

Polybutadiene rubber: "BR730 (high-cis polybutadiene)" available from JSR Corporation Zinc acrylate: "ZNDA-90S" available from Nisshoku Techno Fine Chemical Co., Ltd.

Zinc oxide: "Ginrei (registered trademark) R" available from Toho Zinc Co., Ltd.

Barium sulfate: "Barium Sulfate BD" available from Sakai Chemical Industry Co., Ltd.

Dicumyl peroxide: "Percumyl (registered trademark) D" available from NOF Corporation Diphenyl disulfide: available from Sumitomo Seika Chemicals Co., Ltd.

PBDS: bis(pentabromophenyl) disulfide available from Kawaguchi Chemical Industry Co., Ltd.

2-Naphthalene thiol: available from Tokyo Chemical Industry Co., Ltd.

Benzoic acid: available from Tokyo Chemical Industry Co., Ltd.

(2) Preparation of Cover Composition

Cover materials shown in Tables 2 to 4 were mixed with a twin-screw kneading extruder to prepare cover compositions in a pellet form. The extruding of the inner cover composition was conducted under conditions of: a screw diameter of 45 mm, a screw rotational speed of 200 rpm, screw L/D=35, and a cylinder temperature of 140 to 200° C. The extruding conditions of the outer cover composition were a screw diameter of 45 mm, a screw rotational speed of 200 rpm, and screw L/D=35, and the mixture was heated to 160 to 230° C. at the die position of the extruder.

TABLE 2

| | Golf ball No. | 1 | 2 | 3 | 4 | 5 |
|---|---|---|---|---|---|---|
| Core | Rubber composition No. | B | B | B | B | B |
| | Diameter (mm) | 39.1 | 39.1 | 39.1 | 39.1 | 39.1 |
| Cover composition | Himilan 1555 | 50 | 48 | 50 | 50 | 50 |
| | Himilan AM7329 | 45 | 44 | 45 | 45 | 45 |
| | TEFABLOC T3221C | 5 | 8 | 5 | 5 | 5 |
| | SH2400P | — | — | 3 | — | — |
| | SH2400B-0501 (particle size: 7.4 μm) | — | — | — | 3 | — |
| | SH2400B-2001 (particle size: 20 μm) | — | — | — | — | 3 |
| | Titanium dioxide | 4 | 4 | 4 | 4 | 4 |
| | Thickness (mm) | 1.8 | 1.8 | 1.8 | 1.8 | 1.8 |
| | Shore D hardness | 59 | 57 | 57 | 57 | 57 |
| Ball properties | Durability | P | F | F | G | G |
| | Shot feeling | F | F | G | G | G |

TABLE 3

| | Golf ball No. | 6 | 7 | 8 | 9 | 10 | 11 | 12 | 13 |
|---|---|---|---|---|---|---|---|---|---|
| Core | Rubber composition No. | A | A | A | A | A | A | A | A |
| | Diameter (mm) | 38.2 | 38.2 | 38.2 | 38.2 | 38.2 | 38.2 | 38.2 | 38.2 |
| Inner cover composition | Himilan AM7337 | 26 | 26 | 26 | 26 | 26 | 26 | 26 | 26 |
| | Himilan AM7329 | 26 | 26 | 26 | 26 | 26 | 26 | 26 | 26 |
| | TEFABLOC T3221C | 48 | 48 | 48 | 48 | 48 | 48 | 48 | 48 |
| | Titanium dioxide | 4 | 4 | 4 | 4 | 4 | 4 | 4 | 4 |
| | JF-90 | 0.2 | 0.2 | 0.2 | 0.2 | 0.2 | 0.2 | 0.2 | 0.2 |
| | Thickness (mm) | 1 | 1 | 1 | 1 | 1 | 1 | 1 | 1 |
| | Shore D hardness | 35 | 35 | 35 | 35 | 35 | 35 | 35 | 35 |
| Outer cover composition | Surlyn 8150 | 50 | 45 | 42.5 | 39.5 | 32 | 50 | 50 | 50 |
| | Surlyn 9150 | 50 | 45 | 42.5 | 39.5 | 32 | 50 | 50 | 50 |
| | TEFABLOC T3221C | — | 10 | 15 | 21 | 36 | — | — | — |
| | SH2400P | — | — | — | — | — | 10 | — | — |
| | SH2400B-0501 (particle size: 7.4 μm) | — | — | — | — | — | — | 5 | 10 |
| | SH2400B-2001 (particle size: 20 μm) | — | — | — | — | — | — | — | — |
| | Titanium dioxide | 4 | 4 | 4 | 4 | 4 | 4 | 4 | 4 |
| | Thickness (mm) | 1.25 | 1.25 | 1.25 | 1.25 | 1.25 | 1.25 | 1.25 | 1.25 |
| | Shore D hardness | 69 | 63 | 59 | 55 | 45 | 59 | 63 | 59 |
| Ball properties | Durability | P | P | P | F | F | F | G | G |
| | Shot feeling | P | F | F | F | P | F | G | G |

TABLE 4

| | Golf ball No. | 14 | 15 | 16 | 17 | 18 | 19 | 20 | 21 | 22 | 23 |
|---|---|---|---|---|---|---|---|---|---|---|---|
| Core | Rubber composition No. | C | C | C | C | C | C | C | C | C | C |
| | Diameter (mm) | 39.7 | 39.7 | 39.7 | 39.7 | 39.7 | 39.7 | 39.7 | 39.7 | 39.7 | 39.7 |
| Inner cover composition | Surlyn 8150 | 50 | 45 | 42.5 | 39.5 | 32 | 50 | 50 | 50 | 50 | 50 |
| | Surlyn 9150 | 50 | 45 | 42.5 | 39.5 | 32 | 50 | 50 | 50 | 50 | 50 |
| | TEFABLOC T3221C | — | 10 | 15 | 21 | 36 | — | — | — | — | — |
| | SH2400P | — | — | — | — | — | 10 | — | — | — | — |
| | SH2400B-0501 (particle size: 7.4 μm) | — | — | — | — | — | — | 5 | 10 | 15 | 25 |
| | SH2400B-2001 (particle size: 20 μm) | — | — | — | — | — | — | — | — | — | — |
| | Titanium dioxide | 4 | 4 | 4 | 4 | 4 | 4 | 4 | 4 | 4 | 4 |
| | Thickness (mm) | 1 | 1 | 1 | 1 | 1 | 1 | 1 | 1 | 1 | 1 |
| | Shore D hardness | 69 | 63 | 59 | 55 | 45 | 59 | 63 | 59 | 55 | 45 |

TABLE 4-continued

| | Golf ball No. | 14 | 15 | 16 | 17 | 18 | 19 | 20 | 21 | 22 | 23 |
|---|---|---|---|---|---|---|---|---|---|---|---|
| Outer cover composition | Elastollan XNY85A | 100 | 100 | 100 | 100 | 100 | 100 | 100 | 100 | 100 | 100 |
| | Titanium dioxide | 4 | 4 | 4 | 4 | 4 | 4 | 4 | 4 | 4 | 4 |
| | Thickness (mm) | 0.5 | 0.5 | 0.5 | 0.5 | 0.5 | 0.5 | 0.5 | 0.5 | 0.5 | 0.5 |
| | Shore D hardness | 32 | 32 | 32 | 32 | 32 | 32 | 32 | 32 | 32 | 32 |
| Ball properties | Durability | P | P | P | F | F | F | G | G | G | G |
| | Shot feeling | P | F | F | F | P | F | G | G | G | F |

Surlyn 8150: sodium ion neutralized ethylene-methacrylic acid copolymerized ionomer resin (melt flow rate (190° C., 2.16 kgf): 4.5 g/10 min, bending stiffness: 390 MPa, material hardness: 68 (Shore D)) available from E.I. du Pont de Nemours and Company Surlyn 9150: zinc ion neutralized ethylene-methacrylic acid copolymerized ionomer resin (melt flow rate (190° C., 2.16 kgf): 4.5 g/10 min, bending stiffness: 270 MPa, material hardness: 64 (Shore D)) available from E.I. du Pont de Nemours and Company Himilan AM7337: sodium ion neutralized ethylene-methacrylic acid copolymerized ionomer resin (melt flow rate (190° C., 2.16 kgf): 5 g/10 min, bending stiffness: 272 MPa, material hardness: 64 (Shore D)) available from Mitsui-Du Pont Polychemicals Co., Ltd.

Himilan AM7329: zinc ion neutralized ethylene-methacrylic acid copolymerized ionomer resin (melt flow rate (190° C., 2.16 kgf): 5 g/10 min, bending stiffness: 221 MPa, material hardness: 59 (Shore D)) available from Mitsui-Du Pont Polychemicals Co., Ltd.

Himilan 1555: sodium ion neutralized ethylene-methacrylic acid copolymerized ionomer resin (melt flow rate (190° C., 2.16 kgf): 1 g/10 min, bending stiffness: 240 MPa, material hardness: 63 (Shore D)) available from Mitsui-Du Pont Polychemicals Co., Ltd.

TEFABLOC T3221C: thermoplastic styrene elastomer available from Mitsubishi Chemical Corporation Elastollan XNY85A: thermoplastic polyurethane elastomer available from BASF Japan Ltd.

SH2400P: caprolactone modified polyrotaxane available from Advanced Softmaterials Inc.

SH2400B-0501: polyrotaxane fine particles (crosslinked resin fine particles obtained by curing polyrotaxane with polyisocyanate, median particle size: 7.4 μm, decomposition starting temperature: 306° C.) available from Advanced Softmaterials Inc.

SH2400B-2001: Polyrotaxane fine particles (crosslinked resin fine particles obtained by curing polyrotaxane with polyisocyanate, median particle size: 20 μm, decomposition starting temperature: 306° C.) available from Advanced Softmaterials Inc.

Titanium dioxide: "A220" available from Ishihara Sangyo Kaisha, Ltd.

JF-90: bis(2,2,6,6-tetramethyl-4-piperidyl) sebacate available from Johoku chemical Co., Ltd.

(3) Production of Golf Ball Body
(3-1) Golf balls No. 1 to 5

The above obtained cover composition was directly injection molded on the above obtained spherical core to produce a two-piece golf ball. The upper and lower molds for molding the cover had a hemispherical cavity and pimples, wherein a part of the pimples also served as a retractable hold pin. When molding the cover, the hold pin was protruded to hold the spherical core, and the resin heated to 260° C. was charged for 0.3 second into a mold held under a pressure of 80 ton, and after cooled for 30 seconds, the mold was opened to eject the golf ball. The surface of the obtained golf ball body was subjected to a sandblast treatment, and a mark was formed thereon. Then, a clear paint was applied to the golf ball body, and the paint was dried in an oven of 40° C. to obtain golf balls having a diameter of 42.7 mm and a mass of 45.6 g. Evaluation results regarding the durability and the shot feeling of the obtained golf balls are also shown in Table 2.

(3-2) Golf Balls No. 6 to 13

The above obtained inner cover composition was injection molded on the above obtained spherical core, to form the inner cover covering the spherical core.

The upper and lower molds for molding the inner cover had a hemispherical cavity and a retractable hold pin. The hold pin was protruded to hold the spherical core. The inner cover composition was heated to 200° C. to 260° C. at the cylinder portion of the extruder, and injected into a mold held under a pressure of 15 MPa, and after cooled for 30 seconds, the mold was opened to eject the spherical core covered with the inner cover.

Subsequently, the outer cover composition was injection molded on the inner cover to form the outer cover, thereby producing a golf ball. The upper and lower molds for molding the outer cover had a hemispherical cavity and pimples, wherein a part of the pimples also served as a retractable hold pin. When molding the outer cover, the hold pin was protruded to hold the spherical core covered with the inner cover, and the resin heated to 260° C. was charged for 0.3 second into a mold held under a pressure of 80 ton, and after cooled for 30 seconds, the mold was opened to eject the golf ball. The surface of the obtained golf ball body was subjected to a sandblast treatment, and a mark was formed thereon. Then, a clear paint was applied to the golf ball body, and the paint was dried in an oven of 40° C. to obtain golf balls having a diameter of 42.7 mm and a mass of 45.6 g. Evaluation results regarding the durability and the shot feeling of the obtained golf balls are also shown in Table 3.

(3-3) Golf Balls No. 14 to No. 23

The above obtained inner cover composition was injection molded on the above obtained spherical core, to form the inner cover covering the spherical core. The upper and lower molds for molding the inner cover had a hemispherical cavity and a retractable hold pin. The hold pin was protruded to hold the spherical core. The inner cover composition was heated to 200° C. to 260° C. at the cylinder portion of the injection apparatus, and injected into a mold held under a pressure of 15 MPa, and after cooled for 30 seconds, the mold was opened to eject the spherical core covered with the inner cover.

The obtained outer cover composition in the pellet form was charged into each of the depressed part of the lower mold for molding half shells one by one, and a pressure was applied to mold the half shells. The compression molding was conducted under the following conditions: a molding temperature of 170° C., a molding time of 5 minutes and a molding pressure of 2.94 MPa.

The spherical body covered with the inner cover was concentrically covered with two of the half shells, and the compression molding was conducted to obtain the outer cover (thickness: 0.5 mm). The compression molding was conducted under the following conditions: a molding temperature of 145° C., a molding time of 2 minutes and a molding pressure of 9.8 MPa. The surface of the obtained golf ball body was subjected to a sandblast treatment, and a mark was formed thereon. Then, a clear paint was applied to the golf ball body, and the paint was dried in an oven of 40° C. to obtain golf balls having a diameter of 42.7 mm and a mass of 45.6 g.

Evaluation results of the obtained golf balls are shown in Tables 2 to 4.

The golf ball comprising a spherical core and at least one cover disposed outside the spherical core, wherein at least one layer of the cover contains (A) a base resin and (B) a resin fine particles, (A) the base resin contains an ionomer resin, and (B) the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group, has excellent shot feeling and durability.

The present invention is suitably applied to a golf ball comprising a cover.

This application is based on Japanese patent application No. 2018-195346 filed on Oct. 16, 2018, the content of which is hereby incorporated by reference.

The invention claimed is:

1. A golf ball comprising a spherical core and at least one cover disposed outside the spherical core, wherein at least one layer of the cover contains (A) a base resin and (B) resin fine particles, (A) the base resin contains an ionomer resin, and (B) the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin wherein at least a part of hydroxyl groups of the cyclodextrin is modified with a caprolactone chain via a —O—$C_3H_6$—O— group.

2. The golf ball according to claim 1, wherein the cover contains (B) the resin fine particles in an amount of from 1 part by mass to 20 parts by mass with respect to 100 parts by mass of (A) the base resin component.

3. The golf ball according to claim 1, wherein (B) the resin fine particles have a median size of from 1 μm to 50 μm.

4. The golf ball according to claim 1, wherein (B) the resin fine particles are crosslinked resin fine particles.

5. The golf ball according to claim 4, wherein the crosslinked resin fine particles are a product obtained by a reaction between the polyrotaxane component and a polyisocyanate component.

6. The golf ball according to claim 1, wherein the linear molecule of the polyrotaxane is polyethylene glycol, and the blocking group of the polyrotaxane is an adamantyl group.

7. The golf ball according to claim 1, wherein (A) the base resin component further contains a non-ionomer resin.

8. The golf ball according to claim 1, wherein the cover has a material hardness in a range of from 30 to 80 in Shore D hardness.

9. The golf ball according to claim 7, wherein the non-ionomer resin is at least one member selected from the group consisting of a polyamide, a styrene elastomer, a polyolefin elastomer, a polyamide elastomer, a polyester elastomer, a binary copolymer composed of an olefin and an α,β-unsaturated carboxylic acid having 3 to 8 carbon atoms, and a ternary copolymer composed of an olefin, an α,β-unsaturated carboxylic acid having 3 to 8 carbon atoms and an α,β-unsaturated carboxylic acid ester.

10. The golf ball according to claim 7, wherein an amount of the non-ionomer resin in (A) the base resin ranges from 1 mass % to 50 mass %.

11. The golf ball according to claim 7, wherein a mass ratio (non-ionomer resin/ionomer resin) of the non-ionomer resin to the ionomer resin in (A) the base resin ranges from 1/99 to 50/50.

12. The golf ball according to claim 1, wherein an amount of the ionomer resin in (A) the base resin ranges from 50 mass % to 100 mass %.

13. The golf ball according to claim 1, wherein the ionomer resin has a material hardness in a range of from 40 to 75 in Shore D hardness.

14. The golf ball according to claim 1, wherein (A) the base resin has a material hardness in a range of from 30 to 80 in Shore D hardness.

15. The golf ball according to claim 1, wherein the golf ball is a two-piece golf ball composed of a single layered spherical core and a single layered cover, wherein the single layered cover contains (A) the base resin and (B) the resin fine particles.

16. The golf ball according to claim 1, wherein the golf ball is a three-piece golf ball composed of a single layered spherical core, a single layered inner cover, and a single layered outer cover, wherein any one or both of the inner cover and the outer cover contain (A) the base resin and (B) the resin fine particles.

17. The golf ball according to claim 1, wherein the golf ball is a multi-piece golf ball composed of a single layered spherical core, two or more inner covers, and a single layered outer cover, wherein at least an outermost layer of the two or more inner covers contains (A) the base resin and (B) the resin fine particles.

18. The golf ball according to claim 1, wherein the golf ball is a multi-piece golf ball composed of a single layered spherical core, two or more inner covers, and a single layered outer cover, wherein the outer cover contains (A) the base resin and (B) the resin fine particles.

19. The golf ball according to claim 18, wherein at least an outermost layer of the two or more inner covers also contains (A) the base resin and (B) the resin fine particles.

* * * * *